July 4, 1939.     R. TYLER     2,164,599
HYDRAULIC DRIVE
Filed Dec. 3, 1937
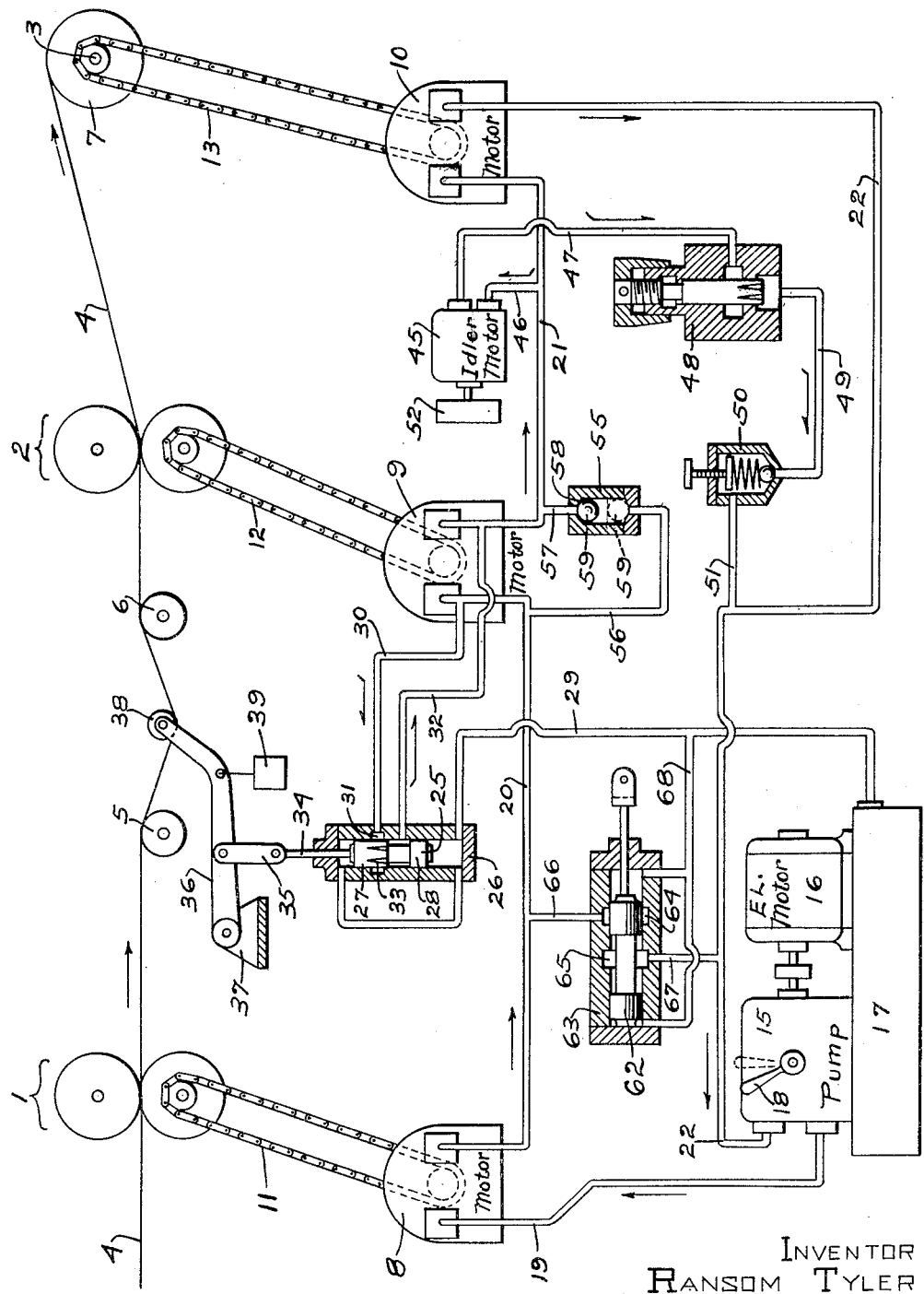
INVENTOR
RANSOM TYLER
BY Wesley P. Merrill
ATTORNEY.

Patented July 4, 1939

2,164,599

UNITED STATES PATENT OFFICE 2,164,599

HYDRAULIC DRIVE

Ransom Tyler, Greenfield, Wis., assignor to The Oilgear Company, Milwaukee, Wis., a corporation of Wisconsin Application December 3, 1937, Serial No. 177,931

19 Claims. (Cl. 242—75)

This invention relates to hydraulic drives for machines or groups of related machines which process or operate upon substantially continuous strips of web material, such as machines which make or operate upon paper, Cellophane, metal foil or the like and then wind the web into rolls.

In such machines or groups of machines, it is essential that the speed of each machine unit except the first or leading unit be maintained exactly proportional to the linear speed of the web as it is delivered to that unit and that a substantially uniform tension be maintained upon the web as it is wound into a roll. This is particularly important if the web being operated upon has but little tensile strength, such as a web of aluminum foil and the thickness of which may not exceed .00025".

The present invention has as an object to provide a drive that is particularly adapted for driving a group of machine units which operate upon and wind into rolls web material having so little tensile strength that the web will break if the tension necessarily maintained thereon during the winding thereof into rolls is increased but slightly.

Another object is to provide a drive which will permit the overall speed of a group of related machines to be varied through a wide range and which will maintain the speed of each machine unit proportional to the linear speed of the web at that unit during such variation in overall speed.

Another object is to provide a drive of the above character which is positive and precise in operation and susceptible of close adjustment and control.

Other objects and advantages will appear from the description hereinafter given of a drive in which the invention is embodied.

According to the invention in one of its aspects, a power driven pump supplies motive liquid to a hydraulic motor which drives one of the machine units, a second hydraulic motor is energized by liquid discharged by the first motor and drives the winder unit which winds the web into a roll, a part of the liquid discharged by the first motor is bypassed around the second motor through a choke and a resistance valve connected in series with each other, and the bypassed liquid flows first through an idler motor and energizes the same, the idler motor having a rotating mass the inertia of which tends to prevent the inertia of the roll from affecting the tension of the web during acceleration and deceleration of the winding unit.

According to the invention in another aspect, another machine unit is driven by a third hydraulic motor which is connected between and in series with the first and second motors, a part of the liquid discharged by the first motor is bypassed around the third motor through a throttle valve, and the throttle valve is adjusted in response to variations in the speed of the web as it passes from the unit driven by the first motor to the unit driven by the third motor.

The invention is exemplified by the drive shown schematically in the accompanying drawing, the single view showing a drive of the type employed to drive a machine which applies a coating to aluminum foil and then winds the foil into rolls.

The machine includes a section or unit for applying coating to the foil, a second section or unit for moving the foil through an oven not shown, and a winder unit for winding the foil into rolls. Since the machine forms no part of the invention, the unit for applying coating has been represented by a pair of rollers and indicated by the reference numeral 1, the second unit has been represented by a pair of rollers and indicated by the reference numeral 2, and the winder unit has been represented by a winder shaft and indicated by the reference numeral 3.

Unit 1 applies coating to a web of foil 4 which passes therefrom over two idler rollers 5 and 6 and through unit 2 to winder 3 which winds it into a roll 7.

Units 1, 2 and 3 are driven, respectively, by three hydraulic motors 8, 9 and 10 which are connected in series with each other. Motors 8, 9 and 10 are connected to units 1, 2 and 3, respectively, by drives 11, 12 and 13 which, for the purpose of illustration, have been shown as chain drives.

Liquid for energizing the motors is supplied by a variable displacement pump 15 which is driven by an electric motor 16 and mounted therewith upon a reservoir 17 containing a supply of motive liquid.

Pump 15 has been shown provided with a manually operated lever 18 for varying its displacement. When lever 18 is in its neutral position as shown in dotted lines, pump 15 is at zero stroke and no liquid will be delivered thereby. When lever 18 is swung toward the left, pump 15 will deliver liquid at a rate corresponding to the distance lever 18 has been moved from its neutral position. In practice, however, pump 15 is ordinarily provided with means for adjusting its displacement from a remote point.

The outlet of pump 15 is connected to the inlet of motor 8 by a channel 19, the outlet of motor 8 is connected to the inlet of motor 9 by channel 20, the outlet of motor 9 is connected to the inlet of motor 10 by a channel 21 and the outlet of motor 10 is connected by a channel 22 to the intake of pump 15.

The arrangement is such that liquid discharged by pump 15 flows through channel 19 to motor 8 and causes it to drive unit 1, the liquid discharged by motor 8 flows through channel 20 to motor 9 and causes it to drive unit 2, the liquid discharged by motor 9 flows through channel 21 to motor 10 and causes it to drive winder 3, and the liquid discharged by motor 10 is returned to pump 15 through channel 22 as indicated by the arrows.

In order that motor 9 may drive unit 2 at a speed exactly proportional to the speed of web 4 and in order that motor 10 may maintain a substantially uniform tension on web 4, the motors are so proportioned in respect to each other or, as in the usual practice, drives 12 and 13 are so proportioned relative to drive 11 that motor 8 discharges liquid at a rate in excess of the rates required by motors 9 and 10 and a part of the liquid discharged by motor 8 is bypassed around each of motors 9 and 10.

As shown, liquid is bypassed around motor 9 at a limited rate under the control of a throttle valve 25 arranged in a valve casing 26 and provided with two spaced apart heads or pistons 27 and 28 which are closely fitted in the bore thereof. In order to prevent entrapped liquid or air from hampering the movement of valve 25, both ends of casing 26 are connected to a drain channel 29 which discharges into reservoir 17.

Channel 20 is connected by a channel 30 to a port 31 which is formed in valve casing 26 and normally covered by valve piston 27, and channel 21 is connected to valve casing 26 at a point between pistons 27 and 28 by a channel 32.

Valve piston 27 has a plurality of tapered grooves 33 formed in its peripheral surface and extending from its lower end to a point short of its upper end so that liquid may flow from channel 30 to channel 32 through grooves 33 at a limited rate which may be varied by raising or lowering valve 25.

The arrangement is such that a small part of the liquid discharged by motor 8 into channel 20 flows through channel 30, valve casing 26 and channel 32 into channel 21, as indicated by the half-arrows, and the greater part of the liquid discharged by motor 8 into channel 20 flows through motor 9 into channel 21 so that the total volume discharged into channel 21 is equal to the volume discharged by motor 8 except for leakage losses.

In order that the rate at which liquid is bypassed around motor 9 may be varied and thereby vary the speed of motor 9 in response to variations in the speed of web 4 relative to the speed of unit 2, valve 25 is provided with a stem 34 which extends through the upper end of casing 26 and is connected by links 35 to a pair of levers 36 intermediate the ends thereof, and levers 36 have one end of each pivoted upon a stationary bracket 37 and the other end of each connected to one end of a float roller 38 which rests upon web 4 between idler rollers 5 and 6. If the pressure exerted upon web 4 by roller 38 is insufficient, a weight 39 may be attached to levers 36.

The arrangement is such that, if motor 9 does not drive unit 2 fast enough to cause web 4 to pass therethrough as fast as it is delivered thereto by unit 1, the length of web between idler rollers 5 and 6 will increase and cause roller 38 to descend and lower throttle valve 25, thereby reducing the rate at which liquid is bypassed around motor 9 and increasing the rate at which liquid flows through motor 9 with the resultant increase in the speed thereof.

Conversely, if motor 9 should drive unit 2 too fast, the length of web between idler rollers 5 and 6 would shorten and cause roller 38 to rise and raise throttle valve 25, thereby increasing the rate at which liquid is bypassed and reducing the rate at which liquid flows through motor 9 with a resultant decrease in the speed of motor 9. The result is that valve 25 will bypass just sufficient liquid to maintain the speed of motor 9 proportional to the speed at which web 4 is delivered to the unit 2.

After the machine has been accelerated to its normal running speed, web 4 is delivered to winder 3 at a substantially uniform rate but, since the diameter of roll 7 increases as the web is wound thereon, the rotary speed of roll 7 must be decreased in order to maintain the peripheral speed of roll 7 constant. Consequently, in order that winder 3 may maintain a substantially uniform tension on web 4 while winding it into a roll, motor 10 must drive winder unit 3 at a relatively high speed when the diameter of roll 7 is small and its speed must be decreased and its torque increased as roll 7 increases in diameter.

In other words, the speed and torque of motor 10 must be varied inversely to each other as web 4 is wound into a roll. This is accomplished in the manner fully explained in my prior Patent 2,082,473. Briefly, a part of the liquid delivered to motor 10 is bypassed through an orifice choke and a resistance valve which are connected in series with each other. The present drive however, which is adapted to drive machines which operate upon web material having but little tensile strength, is provided with means for compensating for the inertia of roll 7.

As shown, an idler motor 45 has one of its ports connected by a channel 46 to channel 21 intermediate the ends thereof and its other port connected by a channel 47 to the inlet of an adjustable choke 48 the outlet of which is connected by a channel 49 to the inlet of a resistance valve 50, and the outlet of resistance valve 50 is connected by a channel 51 to return channel 22 intermediate the ends thereof.

The arrangement is such that a part of the liquid flowing through channel 21 enters motor 10 and causes it to drive winder unit 3 and another part of this liquid flows through channel 46, motor 45, channel 47, choke 48, channel 49, resistance valve 50 and channel 51 into return channel 22, the course of the bypassed liquid being indicated by half-arrows.

If motor 45 does not have sufficient mass in its rotating parts to enable it to perform the function hereinafter described, it may be provided with a flywheel 52 as shown.

Resistance valve 50 remains closed until the pressure in channel 49 reaches a predetermined value so that, when starting the machine, the resistance of valve 50 together with the inertia of idler motor 45 causes the pressure in channel 21 to rise sufficiently to enable motor 10 to have sufficient torque to start the winder unit.

After motor 10 starts, the tension exerted by it upon web 4 will cause the pressure in channel 21 to rise and then motor 45 will start and valve 50 will open so that liquid is bypassed around motor 10.

The power required to accelerate a load is greater than the power required to keep it running after it has been accelerated to its running speed. Consequently, the pressure in channel 21 must be higher during acceleration of unit 3 than immediately after unit 3 has been brought up to speed. This higher pressure tends to cause liquid to be bypassed at a greater rate but, in order to increase the bypassing rate, it is necessary to accelerate motor 45 the inertia of which resists acceleration so that the pressure required to accelerate motor 10 may be maintained in channel 21.

Since the rate at which liquid will flow through a choke depends upon the difference between the pressures prevailing at its inlet and its outlet, and since the pressure in channel 22 remains constant, the flow of liquid through choke 48 will vary in accordance with variations in the pressure prevailing in channel 21.

Since in order to maintain a uniform tension upon web 4, the torque of motor 10 must progressively increase as roll 7 increases in diameter and since the pressure required to drive a motor is proportional to its torque, the pressure in channel 21 will increase as the diameter of roll 7 increases. Consequently, the flow through choke 48 will increase as roll 7 increases in diameter, thereby causing the speed of motor 10 to progressively decrease as the torque increases and enabling motor 10 to maintain a substantially uniform tension upon web 4.

When the machine is being decelerated, the energy stored in roll 7 tends to increase the tension upon web 4 but the energy stored in the rotating parts of idler motor 45 causes it to decelerate more slowly than the driving motors so that motor 45 functions as a pump during deceleration and draws liquid from channel 21 and forces it through the bypass channels. Motor 45 thus functions to decrease the pressure in channel 21 with the resultant decrease in the torque of motor 10, thereby counteracting the effect of the inertia of roll 7 and preventing a material variation in the tension of web 4.

It is to be understood that the drive is operated until all of the channels are completely filled with liquid before the machine is employed to operate upon web material. However, if the machine has been idle for a time, a small quantity of liquid may have leaked from the system. Since it is important that motor 10 start simultaneously with motor 9 when a web is attached to winder shaft 3, means are provided for supplying a small quantity of liquid to channel 21 to insure its being completely filled when motor 9 starts.

As shown, the drive is provided with an injector having a cylinder 55 arranged in a vertical position with its inlet connected to channel 20 by a channel 56 and its outlet connected to channel 21 by a channel 57. Cylinder 55 has a valve seat 58 formed in its upper end around its outlet and it contains an impeller 59 which is slightly smaller in diameter than the bore of cylinder 55.

The arrangement is such that, when the drive is idle, impeller 59 rests upon the lower end of cylinder 55 as shown in dotted lines. When the drive starts, the resistance of motor 9 will cause pressure to rise in channel 20 and this pressure will extend through channel 56 to cylinder 55 and force impeller 59 upward, and impeller 59 will eject a small volume of liquid from cylinder 55 into channel 21, thereby supplying any deficiency of liquid and creating pressure in channel 21. When the drive stops, the pressure in channels 20 and 21 will equalize and impeller 59 will descend by gravity due to its being slightly smaller in diameter than the bore of cylinder 55.

The drive is ordinarily provided with a valve for bypassing liquid around motors 9 and 10 so that units 2 and 3 may remain idle while unit 1 is being driven. As shown, a valve 62 is fitted in a valve casing 63 having two ports 64 and 65 formed therein and connected, respectively, to channels 20 and 22 by two channels 66 and 67 so that, when valve 62 is in the position shown, communication between channels 20 and 22 is blocked and the drive will function in the above described manner and, when valve 62 is shifted toward the right to open port 64 to port 65, the liquid discharged by motor 8 will flow through channels 20 and 66, valve casing 63 and channel 67 into return channel 22 and motors 9 and 10 will remain idle. In order that movement of valve 62 may not be hampered by entrapped liquid or gas, both ends of valve casing 63 are connected to drain channel 29 by a channel 68.

In practice however, the drive is ordinarily provided with a valve which differs somewhat from valve 62 and functions to direct the liquid discharged from motors 9 and 10 through a resistance valve which functions as a brake to decelerate motors 9 and 10. The use of a resistance valve for decelerating a hydraulic motor is well known and fully illustrated and described in my prior patent referred to above. Consequently, the resistance valve has been omitted from the drawing and the drive has been shown provided with a simple bypass valve in order to avoid adding unnecessary complications to the drawing and encumbering the specification with unnecessary descriptive matter.

If the machine to be driven consists of more than three units, as many motors 9 as are required may be connected between motors 8 and 10 and provided with suitable controls such as the control shown. Also, if the machine to be driven consists of two units one of which is a winder unit, motor 9 and injector 55—59 and all connections thereto may be omitted and channel 21 connected directly to channel 20 and, if the machine to be driven consists of but two units neither of which is a winding unit, motor 10 and injector 55—59 and all connections thereto may be omitted and channel 21 connected directly to channel 22.

The invention herein set forth is susceptible of various modifications and adaptations without departing from the scope thereof as hereafter claimed.

The invention is hereby claimed as follows:

1. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor at a limited rate, means responsive to variations in the relative speeds of said second unit and said web for varying the rate at which liquid is bypassed around said second motor, and means for bypassing a part of said liquid around said third motor at a limited rate and for varying said rate in response to variations in the torque of said third motor to thereby cause the speed of said third motor to vary inversely to variations in the torque thereof.

2. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for by-passing liquid around said second motor at a limited rate, means responsive to variations in the relative speeds of said second unit and said web for varying the rate at which liquid is bypassed around said second motor, means for bypassing a part of said liquid around said third motor at a limited rate and for varying said rate in response to variations in the torque of said third motor to thereby cause the speed of said third motor to vary inversely to variations in the torque thereof, and means responsive to acceleration and deceleration of said third motor for causing the torque of said third motor to increase during acceleration and to decrease during deceleration to thereby prevent the inertia of said roll from causing a material variation in the tension of said web.

3. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor at a limited rate, means responsive to variations in the relative speeds of said second unit and said web for varying the rate at which liquid is bypassed around said second motor, means for bypassing a part of said liquid around said third motor at a limited rate and for varying said rate in response to variations in the torque of said third motor to thereby cause the speed of said third motor to vary inversely to variations in the torque thereof, and an idler motor connected in series with the means for bypassing liquid around said third motor, said idler motor having sufficient rotating mass to counterbalance at least in part the mass of said roll and thereby prevent a material variation in the tension of said web during acceleration or deceleration of said motor.

4. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for by-passing liquid around said second motor at a limited rate, means responsive to variations in the relative speeds of said second unit and said web for varying the rate at which liquid is bypassed around said second motor, means for bypassing a part of said liquid around said third motor including a choke and a resistance valve connected in series with each other, and an idler motor connected in series with said choke and said resistance valve and having sufficient rotating mass to counterbalance at least in part the mass of said roll to thereby prevent a material variation in the tension of said web during acceleration or deceleration of said third motor.

5. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, means responsive to variations in the relative speeds of said web and said second unit for adjusting said valve to thereby vary the rate at which liquid is bypassed, and means for bypassing a part of said liquid around said third motor and for varying said rate in response to variations in the torque of said third motor to thereby cause the speed of said third motor to vary inversely to variations in the torque thereof.

6. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, means responsive to variations in the relative speeds of said web and said second unit for adjusting said valve to thereby vary the rate at which liquid is bypassed, means for bypassing a part of said liquid around said third motor and for varying said rate in response to variations in the torque of said third motor to thereby cause the speed of said third motor to vary inversely to variations in the torque thereof, and means responsive to acceleration and deceleration of said third motor for causing the torque of said third motor to increase during acceleration and to decrease during deceleration to thereby prevent the inertia of said roll from causing a material variation in the tension of said web.

7. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, means responsive to variations in the relative speeds of said web and said second unit for adjusting said valve to thereby vary the rate at which liquid is bypassed, means for bypassing a part of said liquid around said third motor and for varying said rate in response to variations in the torque of said third motor to thereby cause the speed of said third motor to vary inversely to variations in the torque thereof, and an idler motor connected in series with the means for bypassing liquid around said third motor, said idler motor having sufficient rotating mass to counterbalance at least in part the mass of said roll and thereby prevent a material variation in the tension of said web during acceleration or deceleration of said motor.

8. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, means responsive to variations in the relative speeds of said web and said second unit for adjusting said valve to thereby vary the rate at which liquid is bypassed, means for bypassing a part of said liquid around said third motor including a choke and a resistance valve connected in series with each other, and an idler motor connected in series with said choke and said resistance valve and having sufficient rotating mass to counterbalance at least in part the mass of said roll to thereby prevent a material variation in the tension of said web during acceleration or deceleration of said third motor.

9. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, a float roller supported by said web whereby said roller will move vertically in response to variations in the relative speeds of said web and said second unit, means responsive to vertical movement of said roller for adjusting said valve to thereby vary the rate at which liquid is bypassed, and means for bypassing a part of said liquid around said third motor at a limited rate and for varying said rate in response to variations in the torque of said third motor to thereby cause the speed of said third motor to vary inversely to variations in the torque thereof.

10. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, a float roller supported by said web whereby said roller will move vertically in response to variations in the relative speeds of said web and said second unit, means responsive to vertical movement of said roller for adjusting said valve to thereby vary the rate at which liquid is bypassed, means for bypassing a part of said liquid around said third motor at a limited rate and for varying said rate in response to variations in the torque of said third motor to thereby cause the speed of said third motor to vary inversely to variations in the torque thereof, and means responsive to acceleration and deceleration of said third motor for causing the torque of said third motor to increase during acceleration and to decrease during deceleration to thereby prevent the inertia of said roll from causing a material variation in the tension of said web.

11. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, a float roller supported by said web whereby said roller will move vertically in response to variations in the relative speeds of said web and said second unit, means responsive to vertical movement of said roller for adjusting said valve to thereby vary the rate at which liquid is bypassed, means for bypassing a part of said liquid around said third motor at a limited rate and for varying said rate in response to variations in the torque of said third motor to thereby cause the speed of said third motor to vary inversely to variations in the torque thereof, and an idler motor connected in series with the means for bypassing liquid around said third motor, said idler motor having sufficient rotating mass to counterbalance at least in part the mass of said roll and thereby prevent a material variation in the tension of said web during acceleration or deceleration of said motor.

12. The combination, with a group of related machine units for operating upon a substantially continuous strip of web material and including a first and a second unit through which said web passes successively and a winder unit which winds said web into a roll, of a drive for said group comprising a first hydraulic motor for driving said first unit, a second hydraulic motor for driving said second unit, a third hydraulic motor for driving said winder unit, a pump, means for driving said pump, fluid channels connecting said motors in series with each other and with said pump whereby liquid discharged by said pump is delivered to and energizes said motors successively, said liquid being in excess of the liquid normally required to operate said second and third motors at the proper speeds, means for bypassing liquid around said second motor including a throttle valve to control the rate at which liquid is bypassed, a float roller supported by said web whereby said roller will move vertically in response to variations in the relative speeds of said web and said second unit, means responsive to vertical movement of said roller for adjusting said valve to thereby vary the rate at which liquid is bypassed, means for bypassing a part of said liquid around said third motor including a choke and a resistance valve connected in series with each other, and an idler motor connected in series with said choke and said resistance valve and having sufficient rotating mass to counterbalance at least in part the mass of said roll to thereby prevent a material variation in the tension of said web during acceleration or deceleration of said third motor.

13. The combination, with a machine unit for operating upon a web and means for delivering said web to said unit in a substantially continuous strip, of a first hydraulic motor for driving said unit, means including a first channel for supplying motive liquid to said motor to energize the same, means for regulating the speed of said motor, a winding shaft, a second hydraulic motor for rotating said shaft to cause it to wind said web into a roll thereon and to maintain tension upon the web between said unit and said roll, a second channel connecting the inlet of said second motor to the outlet of said first motor to thereby cause said second motor to be driven by liquid discharged by said first motor, means for regulating the speed of said second motor, and means for causing said motors to start simultaneously including an injector connected between said channels and adapted to inject a limited volume of liquid into said second channel in response to pressure being created in said first channel to start said first motor.

14. The combination, with a machine unit for operating upon a web and means for delivering said web to said unit in a substantially continuous strip, of a first hydraulic motor for driving said unit, means including a first channel for supplying motive liquid to said motor to energize the same, means for regulating the speed of said motor, a winding shaft, a second hydraulic motor for rotating said shaft to cause it to wind said web into a roll thereon and to maintain tension upon the web between said unit and said roll, a second channel connecting the inlet of said second motor to the outlet of said first motor to thereby cause said second motor to be driven by liquid discharged by said first motor, means for regulating the speed of said second motor, and means for causing said motors to start simultaneously including a cylinder arranged in a vertical position and having its lower and upper ends connected to said first and second channels respectively, an impeller loosely fitted in said cylinder and adapted to be forced upward and inject a limited volume of liquid into said second channel in response to pressure being created in said first channel to start said first motor, and a valve seat arranged in the upper end of said cylinder to be engaged by said impeller.

15. The combination, with a winding shaft and means for delivering a substantially continuous web of material thereto at a regulated rate, of a hydraulic motor for rotating said shaft to cause it to wind said web into a roll and to maintain tension upon the web between said roll and said means, means for supplying motive liquid to said motor at a rate in excess of the rate required by said motor, means for bypassing a part of said liquid around said motor at a limited rate and for varying said bypassing rate directly in response to variations in the torque of said motor to thereby cause the speed of said motor to vary inversely to the torque thereof, and means responsive to acceleration and deceleration of said motor for causing the torque of said motor to increase during acceleration and to decrease during deceleration to thereby prevent the inertia of said roll from causing a material variation in the tension of said web.

16. The combination, with a winding shaft and means for delivering a substantially continuous web of material thereto at a regulated rate, of a hydraulic motor for rotating said shaft to cause it to wind said web into a roll and to maintain tension upon the web between said roll and said means, means for supplying motive liquid to said motor at a rate in excess of the rate required by said motor, means for bypassing a part of said liquid around said motor at a limited rate and for varying said bypassing rate directly in response to variations in the torque of said motor to thereby cause the speed of said motor to vary inversely to the torque thereof, and an idler motor connected in series with said bypassing means and having sufficient rotating mass to counterbalance at least in part the mass of said roll and thereby prevent a material variation in the tension of said web during acceleration or deceleration of said motor.

17. The combination, with a winding shaft and means for delivering a substantially continuous web of material thereto at a regulated rate, of a hydraulic motor for rotating said shaft to cause it to wind said web into a roll and to maintain tension upon the web between said roll and said means, means for supplying motive liquid to said motor at a rate in excess of the rate required by said motor, means for bypassing a part of said liquid around said motor at a limited rate including a choke and a resistance valve connected in series with each other, and an idler motor connected in series with said choke and said resistance valve and having sufficient rotating mass to counterbalance at least in part the mass of said roll to thereby prevent a material variation in the tension of said web during acceleration or deceleration of said motor.

18. The combination, with a machine unit for operating upon a web and means for delivering said web to said unit in a substantially continuous strip, of a hydraulic motor for driving said unit, means for delivering motive liquid to said motor at a rate in excess of the rate required by said motor to cause it to drive said unit at a speed proportional to the normal speed of said web and to maintain a substantially constant tension upon said web, means including a throttle valve for bypassing around said motor the excess liquid delivered thereto, and means responsive to variations in the relative speeds of said web and said unit for adjusting said valve to thereby vary the rate at which liquid is bypassed and enable said motor to maintain the tension of said web substantially constant.

19. The combination, with a machine unit for operating upon a web and means for delivering said web to said unit in a substantially continuous strip, of a hydraulic motor for driving said unit, means for delivering motive liquid to said motor at a rate in excess of the rate required by said motor to cause it to drive said unit at a speed proportional to the normal speed of said web and to maintain a substantially constant tension upon said web, means for bypassing around said motor the excess liquid delivered thereto, means for varying the rate at which liquid is bypassed, a float roller supported by said web whereby said roller will move vertically in response to variations in the relative speeds of said web and said unit, and means responsive to vertical movement of said roller for adjusting said bypass rate varying means to thereby maintain the tension of said web substantially constant.

RANSOM TYLER.